F. B. LOVEJOY AND L. C. RITTMEYER.
ROLLER BEARING.
APPLICATION FILED AUG. 28, 1920.
1,413,173. Patented Apr. 18, 1922.
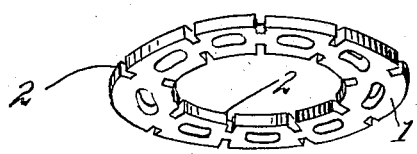
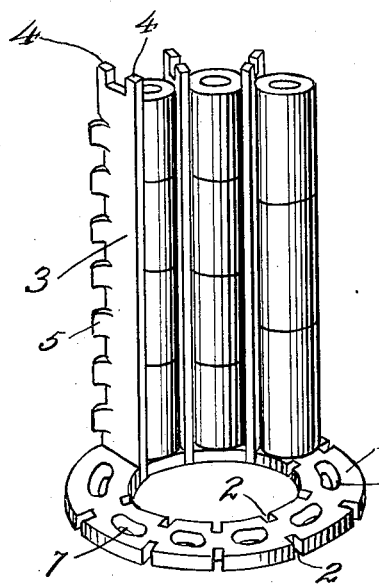
Fig. 1.
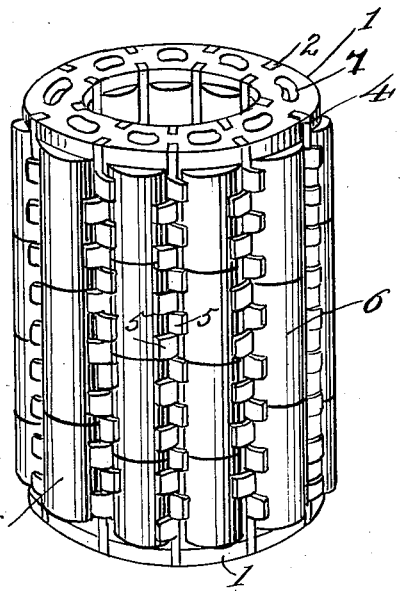
Fig. 2.
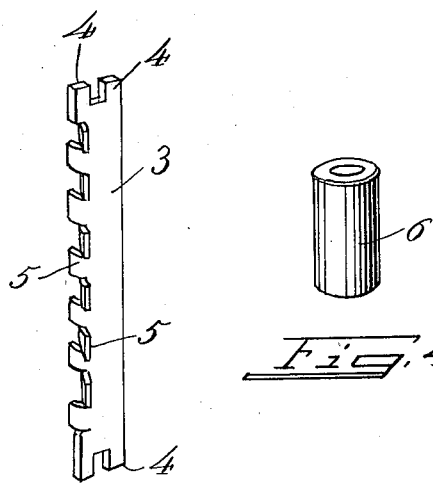
Fig. 3. Fig. 4.
INVENTORS
Frederick B Lovejoy
Louis C Rittmeyer
BY
Allen & Allen
ATTORNEYS.

UNITED STATES PATENT OFFICE.

FREDERICK B. LOVEJOY AND LOUIS C. RITTMEYER, OF CINCINNATI, OHIO.

ROLLER BEARING.

1,413,173.  Specification of Letters Patent.  Patented Apr. 18, 1922.

Application filed August 28, 1920. Serial No. 406,618.

*To all whom it may concern:*

Be it known that we, FREDERICK B. LOVEJOY and LOUIS C. RITTMEYER, citizens of the United States, and residents of Cincinnati, in the county of Hamilton and State of Ohio, have invented certain new and useful Improvements in Roller Bearings, of which the following is a full, clear, and exact description, reference being had to the drawings forming a part of this specification.

The object of our invention is to provide a simple, cheap and effective cage for roller bearings which can be constructed and assembled readily and easily for the holding of a number of short rollers to avoid the wear caused by twisting of the bearing where single long rollers are provided, and it consists of that certain novel construction and arrangement of parts to be hereinafter particularly pointed out and claimed.

In the drawings,

Figure 1 is a perspective view of the construction partly assembled.

Figure 2 is a similar view complete.

Figure 3 is a perspective of one of the roller separator plates.

Figure 4 is a perspective of one of the short rollers of the bearing.

The cage comprises flat end rings 1 of suitable metal provided with radial notches 2, 2, opposite each other around both the outer and inner periphery of the ring.

Separator plates 3 are provided to hold in spaced relation the rollers of the bearing. These plates are formed with the tongues 4, 4 at each end to fit in the notches or grooves 2, 2 of the end rings, and to hold the rollers when assembled in the cage the separator plates are cut along one longitudinal edge. The tabs or ears 5, 5, so formed are bent over alternately in opposite directions to retain the rollers 6 in place.

To assemble the bearing we mount the separator plates around one end ring, securing the plates rigidly in place by inserting the tongues 4, 4, in the grooves or notches 2, 2, and then upsetting or riveting the tongues in place. The short rollers 6, 6 are then dropped in and held from falling out by the ears 5, 5. The other end ring is then located in place and the tongues of the separator plates riveted and the roller is complete.

By employing a number of short rollers we avoid wear on the ends of the outside rollers, as the looseness of the individual rollers in the cage permits the rollers to adjust themselves to slight twists of the bearing, whereas with single long rollers any twisting crowds the ends of the long roller between the bearing sleeve or shaft and the outer race-way, causing excessive wear of the parts.

To lighten the end rings they are preferably provided with cored-out portions 7 and the rollers themselves are provided in the shape of hollow cylindrical tubes.

The entire cage is strong and substantial, the end rings are interchangeable and the separator plates are duplicates of each other. The construction is therefore very cheap to manufacture and is at the same time strong and durable and very simple and easy to assemble.

Having thus described our invention, what we claim as new and desire to secure by Letters Patent, is:—

1. In a roller bearing the combination with a series of rollers, of a cage for holding the same comprising flat end rings notched on each periphery with flat separator plates for spacing apart the rollers and against which the rollers bear, said plates riveted in the notches of the end rings and provided with tabs extending outwardly and bent to hold the rollers in place.

2. In a roller bearing, the combination with a plurality of short rollers arranged loosely in line to form a series of unit rollers, of a cage for holding the same comprising flat end rings notched on each periphery with flat separator plates for spacing apart the rollers and against which the rollers bear, said plates riveted in the notches of the end rings and provided with tabs extending outwardly and bent to hold the rollers in place.

3. In a roller bearing, the combination with a plurality of short rollers arranged loosely in line to form a series of unit rollers, of a cage for holding the same comprising flat end rings notched on each periphery with flat separator plates for spacing apart the rollers and against which the rollers bear, said plates riveted in the notches of the end rings and provided with tabs bent outwardly and alternately in opposite directions to hold the rollers in place.

FREDERICK B. LOVEJOY.
LOUIS C. RITTMEYER.